May 24, 1955     W. W. HOHENNER     2,708,848

MECHANISM FOR PRODUCING ANGULAR HARMONIC MOTION

Filed June 30, 1952

INVENTOR.
Welmet W. Hohenner
BY
A. R. McCrady
ATTORNEY

United States Patent Office 2,708,848
Patented May 24, 1955

---

2,708,848

MECHANISM FOR PRODUCING ANGULAR HARMONIC MOTION

Werner W. Hohenner, Camarillo, Calif.

Application June 30, 1952, Serial No. 296,507

6 Claims. (Cl. 74—25)

(Granted under Title 35, U. S. Code (1952), sec. 266)

The invention described herein may be manufactured and used by or for the Government of the United States of America for governmental purposes without the payment of any royalties thereon or therefor.

This invention relates to mechanism for producing harmonic angular movement, such as simple harmonic angular oscillation of a table or the like.

The invention contemplates apparatus which will produce harmonic angular oscillations of approximately mathematical accuracy, the deviations from theoretically correct movement being within the limits required for certain technical or scientific purposes.

To accomplish this, uniform rotary movement of two elements about spaced centers of rotation is translated into angular oscillation of a third element about a third center, and a corrected component of this oscillation is applied to the table.

The invention is disclosed as applied to the oscillation of a shake table upon which may be mounted pick-up or other mechanisms used in missiles. Such mechanisms may indicate, or may in other ways be sensitive to, the angular accelerations to which the missile is subjected during flight. In order to determine the accuracy and operability of such a mechanism, it must be calibrated or tested by subjecting it to angular accelerations, and it is preferable that these accelerations be harmonic, since harmonic motion facilitates the use of mathematical expressions which are well defined and easily obtained.

An object of the invention is to provide simplified mechanism of the type above indicated, and having a high degree of accuracy.

Other objects and many of the attendant advantages of this invention will be readily appreciated as the same becomes better understood by reference to the following description.

Figure 1:
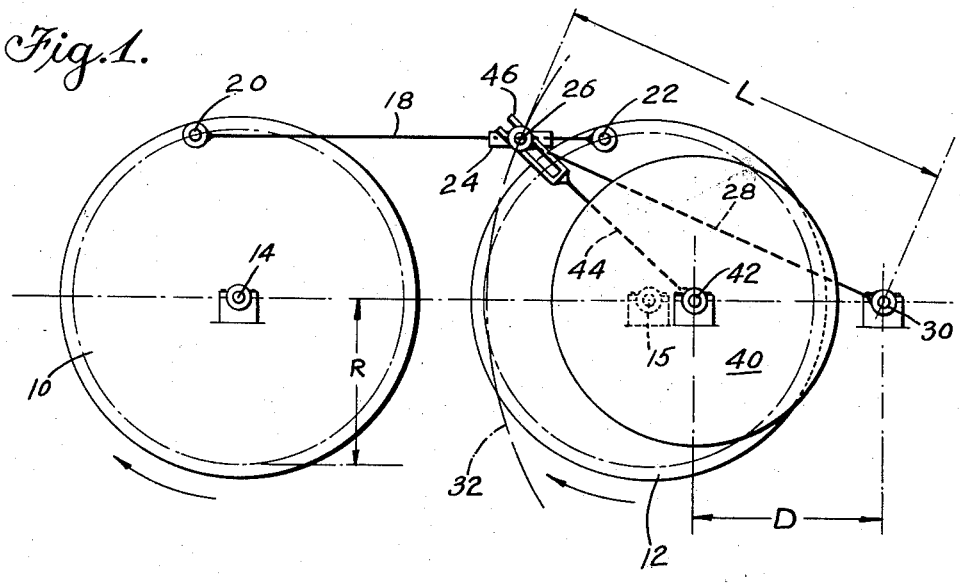
Fig. 1 is a diagrammatic view of apparatus embodying the invention.
Figure 2:
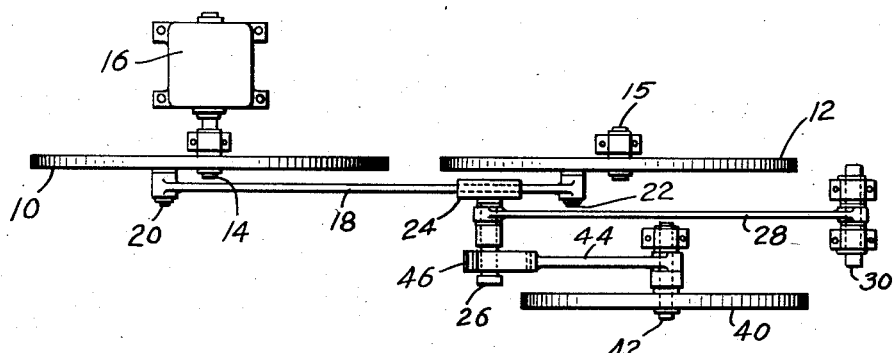
Fig. 2 is a plan view of the same, showing the mechanical features of the apparatus.

The apparatus shown in the drawing comprises rotary disks 10 and 12, having parallel axes 14, 15 and rotatable in a common plane. The two disks are rotated in synchronism with each other at uniform speed by any suitable means indicated schematically by motor 16 in Fig. 2, and are interconnected by a connecting rod 18 pivoted to the disks at 20 and 22, at a distance of R from axes 14, 15, the distance between pivot points 20 and 22 being equal to the distance between axes 14 and 15. The vertical displacement of rod 18 will under these circumstances be truly harmonic.

A slide 24 is mounted on rod 18 and carries a transverse pin 26 to which is pivoted one end of an oscillating arm 28, of length L, the other end of which is pivoted to a stationary pin 30 which lies in the plane of axes 14 and 15. It will be seen that upon rotation of disks 10 and 12 in either direction, pin 26 of the slide will be caused to move along an arc 32.

The table to be oscillated is indicated at 40, and is mounted on a pivot pin 42 which lies in the plane of pivots 14, 15 and 30, and spaced by a distance D from pivot 30. Fixed to the table 40 is one end of a lever arm 44 the other end of which is slidably related to the pin 26, either by passing therethrough in known manner or by being provided with a bifurcated end 46 which embraces it as shown. It will be apparent that oscillatory movement of pin 26 along arc 32 will cause oscillation of table 40.

If the distance D is selected with a length equal to 0.35 of part 28 (L) and, in addition, the maximum amplitude R is made 0.51 of the length of part 28, then the maximum oscillation of the torsional shake table 40 reaches a value of ±45°. The maximal error during one cycle is then about ±4' against the mathematically correct position. The error decreases if the maximum amplitude R is reduced by any suitable means, which causes in return a reduction of the angular oscillation of the shake table 40.

The proportional relationship of the distance D, of the length L, of the part 28 and the maximum amplitude R, as given above, is derived from a mathematical investigation, which results in the following ratio:

$$R = 0.51L$$

$$D = 0.35L$$

Obviously many modifications and variations of the present invention are possible in the light of the above teachings. It is therefore to be understood that within the scope of the appended claims the invention may be practiced otherwise than as specifically described.

What is claimed is:

1. Apparatus for producing harmonic oscillation of a table or the like, comprising two members rotatable on parallel axes, a rod connecting said members to maintain them in synchronism, a pivot pin slidable along said rod, a first arm pivoted to said pin and its other end pivoted to a fixed point in the plane of said axes, and a second arm having one end fixed to said table and its other end slidably connected to said pin.

2. Apparatus for producing harmonic angular oscillation of a table or the like, comprising two members synchronously rotatable on parallel axes, a rod connecting said members, a pivot pin slidable along said rod, a first arm having one end pivoted to said pin and its other end pivoted to a fixed point in the plane of said axes, and a second arm having one end fixed to said table and its other end slidably connected to said pin.

3. Apparatus for producing approximately harmonic oscillation of a shake table, comprising two members rotatable in unison on spaced parallel axes, a rod connecting said members, a pivot pin slidably mounted on said rod, a first arm having one end pivoted to said pin and its other end pivoted to a fixed point in the plane of said axes, and a second arm having one end fixed to said table and its other end slidably connected to said pin.

4. In combination with a shake table mounted for oscillation about an axis normal to the plane of the table, two members rotatable on spaced parallel axes in a plane which includes said first mentioned axis, a tie rod connecting said members to cause them to rotate in unison, a pivot pin slidably mounted on said rod, a first arm having one end pivoted to said pin and its other end pivoted to a fixed point in said plane, and a second arm having one end fixed to said table and its other end slidably connected to said pin.

5. The invention defined in claim 4, wherein the ratio of the length of said first arm to the distance between said fixed point and the first mentioned axis is 1:0.35.

6. The invention defined in claim 5, wherein the ratio of the length of said first arm to the distance between the axis of either of said members and the point of connection thereto of said tie rod is 1:0.51.

References Cited in the file of this patent

UNITED STATES PATENTS

| | | |
|---|---|---|
| 2,364,429 | Dougherty | Dec. 5, 1944 |
| 2,585,349 | Rossell | Feb. 12, 1952 |

FOREIGN PATENTS

| | | |
|---|---|---|
| 774,350 | France | Sept. 17, 1934 |